United States Patent

Willis

[11] Patent Number: 6,067,736
[45] Date of Patent: May 30, 2000

[54] SPOT-CULTIVATION SYSTEM

[76] Inventor: Brett William Willis, 21 Baldwin Ave., Rotorua 3201, New Zealand

[21] Appl. No.: 08/930,466
[22] PCT Filed: Jan. 31, 1996
[86] PCT No.: PCT/NZ96/00005
 § 371 Date: Jan. 30, 1998
 § 102(e) Date: Jan. 30, 1998
[87] PCT Pub. No.: WO96/28961
 PCT Pub. Date: Sep. 26, 1996

[30] Foreign Application Priority Data

Mar. 20, 1995 [NZ] New Zealand .............. 270756

[51] Int. Cl.⁷ ................ A01C 7/00; E02F 3/04
[52] U.S. Cl. ................ 37/405; 172/139
[58] Field of Search ............ 37/403, 404, 405, 37/406; 172/777, 778, 245, 246, 247, 139; 414/724, 912

[56] References Cited

U.S. PATENT DOCUMENTS

| | | |
|---|---|---|
| 2,975,842 | 3/1961 | Mostrong . |
| 3,430,703 | 3/1969 | Richey ............... 37/404 |
| 3,959,900 | 6/1976 | Luck ............... 37/403 |
| 4,336,844 | 6/1982 | Helbig et al. . |
| 5,515,625 | 5/1996 | Keigley ............... 37/405 |

FOREIGN PATENT DOCUMENTS

| | | |
|---|---|---|
| 549 652 | 2/1923 | France . |
| 2 058 753 | 5/1971 | France . |
| 189426 | 3/1982 | New Zealand . |
| 194663 | 5/1982 | New Zealand . |
| WO 94/19925 | 9/1994 | WIPO . |

*Primary Examiner*—Robert E Pezzuto
*Attorney, Agent, or Firm*—Darby & Darby

[57] ABSTRACT

This invention relates to a spot-cultivation system. In particular, it is envisaged that the spot-cultivation system will be most commonly used in situations where a defined area of ground is required to be prepared prior to the planting of individual seedling trees. According to one aspect of the present invention there is provided a spot-cultivation system including an accessory (1) for spot-cultivation, attachment apparatus capable of attaching the accessory to a vehicle, and at least two ground-working devices (4, 5) held in a fixed relationship to each other so that the area of ground worked by the devices is defined by the fixed relationship.

30 Claims, 6 Drawing Sheets

SPOT-CULTIVATION SYSTEM

TECHNICAL FIELD

This invention relates to a spot-cultivation system.

In particular, it is envisaged that the spot-cultivation system will be most commonly used in situations where a defined area of ground is required to be prepared prior to the planting of individual seedling trees. However, the present invention could have application outside this field.

BACKGROUND ART

Present cultivating systems are frequently designed to be attached to a tractor, bulldozer or other excavating vehicles.

Typically, the use of these vehicles results in extra and unnecessary damage to the area being cultivated. Movement of the vehicles backwards and forwards across the area may lead to undesirable compaction of the ground, unnecessary damage to other vegetation, or cultivation of ground which is not required to be planted. As a result, planted seedlings may have difficulty becoming established because compacted ground stifles root growth; loss of other vegetation removes protection for seedlings from frosts, wind or sun; over-cultivation of the ground may mix infertile subsoils with topsoils depleting the availability of nutrients to the plants; and exposed earth may be subject to erosion by wind and rain.

In addition, many cultivating systems are designed for flat areas such as paddocks, playing fields, etc. Typically, the entire surface of the ground is cultivated—often for planting crops or grass species. Frequently, multiple ground-working tools are incorporated in an arrangement which is towed by a vehicle, such as a tractor. Such systems are not designed for and are not capable of cultivating small patches of ground in preparation for single plants.

Further, the cultivating system is frequently towed around the area to be cultivated and the ground-working tools act on the ground in a set sequence. There is often no provision for a particular tool to independently pass over the same ground a number of times to ensure optimum preparation of the ground by that tool. Frequently, the entire cultivating apparatus may have to re-work over the same patch of ground to satisfactorily prepare that ground for plants or seeds.

Systems which are capable of cultivating small patches of ground typically incorporate a single ground-working tool. Often single ground-working tools perform a particular function and act on the ground in a particular way. As a result, separate ground-working tools may have to be fitted and removed according to the stage of preparation of the ground at a particular site. This may be a costly procedure in terms of operator time and the necessity of having to carry several different ground-working tools.

Further, many present cultivating systems are incapable of preparing the ground to the precise requirements for individual plant species—such as seedling trees, on a commercially viable, efficient, consistent and cost effective basis.

After the ground has been cultivated, further preparation of the ground prior to planting of plants may require separate fertiliser and herbicide applications. These separate applications increase the time taken for the ground to be prepared; may involve costs associated with using separate attachments or separate vehicles; may be labour intensive; and may result in wastage of fertiliser and herbicide applied to a wider area than is required.

In addition, fertilisers applied to the top of the ground may be blown away, or leach faster as a result of exposure to the weather. Therefore, additional machinery may be required to work the fertiliser into the ground.

Similarly, systems which require that fertilisers or herbicide be applied after planting has occurred are also time consuming, may involve the use of extra machinery, and may result in inaccurate applications negatively affecting, rather than promoting growth of the preferred plants.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a spot-cultivation system including an accessory for spot-cultivation, attachment apparatus capable of attaching the accessory to a vehicle, and at least two ground-working devices held in a fixed relationship to each other so that the area of ground worked by the devices is defined by the fixed relationship.

According to another aspect of the present invention there is provided a spot-cultivation system substantially as described above wherein operation of the distributing apparatus enables measured amounts of substances, in granular or pellet form, to be transferred from a reservoir in said distributing apparatus and be incorporated into the ground during preparation of the ground prior to planting seedling plants.

According to another aspect of the present invention there is provided a spot-cultivation system substantially as described above wherein the spot-cultivation system also incorporates spraying apparatus capable of spraying fluids around and onto the prepared ground.

According to another aspect of the present invention there is provided a method of spot-cultivation of the ground prior to planting seedling plants using a spot-cultivation system substantially as described above wherein the spot-cultivation involves the use of ripping apparatus, rake-mounding apparatus, distributing apparatus and spraying apparatus.

In preferred embodiments of the present invention the spot-cultivation system includes an accessory which is capable of being attached to a hydraulic powered arm of an excavator. Excavators are able to be used in ground preparation operations in ways which minimise unnecessary disturbance to the ground.

However, in some embodiments of the present invention, the spot-cultivation system may also be attached to a bulldozer, tractor, or be adapted to be attached to other vehicles.

In preferred embodiments of the present invention the accessory of the spot-cultivation system is attached to a vehicle by adapting apparatus in combination with appropriately positioned apertures and removable fastening apparatus.

In preferred embodiments of the present invention the adapting apparatus is capable of receiving the free distal end portion of the arm of an excavator, or an appropriate structure of other vehicles. Thus, the adapting apparatus is capable of effectively fitting the accessory of the spot-cultivation system to the arm of an excavator.

In preferred embodiments of the present invention the removable fastening apparatus are capable of passing through both the apertures of the adapting apparatus and the apertures on the structure of the vehicle to which the accessory of the spot-cultivating system is being attached. The removable fastening apparatus therefore retains the accessory in position on the vehicle, during operation of the spot-cultivation system.

For ease of reference the adapting apparatus and fastening apparatus shall now be referred to as a bracket and as bolts respectively, although it should be appreciated that use of these terms is not to be seen as limiting.

In preferred embodiments of the present invention the bracket, apertures and removable bolts of the attachment apparatus enable the accessory of the spot-cultivation system to be attached to the vehicle as required. This enables a vehicle to be used for a number of other functions without limiting its use to spot-cultivation operations alone.

In addition, the accessory of the spot-cultivation system may be transferred to another vehicle if, an excavator for example, is unavailable. The removable bolts of the attachment apparatus enables the accessory to be attached and detached from the vehicle quickly and easily, thereby minimising labour costs and decreasing the time taken to prepare the ground.

In some embodiments of the present invention however, the accessory of the spot-cultivation system may be permanently fixed to a vehicle, or may be attached by other suitable attachment means adapted for use with the spot-cultivation system.

In preferred embodiments of the present invention the accessory of the spot-cultivation system includes at least two ground-working devices. Having two ground-working devices incorporated into the one accessory obviates problems of having to attach and detach individual ground-working devices required to accomplish different ground preparation operations. Such problems include increased time spent on preparing the machinery for ground cultivation, and problems of safety relating to the lifting and manoeuvring heavy ground-working devices when attaching and detaching individual devices to a vehicle. In addition, having two ground-working devices incorporated into the one accessory minimises the overall time taken to cultivate the ground.

In some embodiments of the present invention there may be more than two ground-working devices incorporated into the accessory. The type and number of ground-working devices incorporated into the accessory may be dependent on the type of ground and the extent of ground preparation required.

In preferred embodiments of the present invention the fixed relationship of the ground-working devices enables the area of the ground worked by the devices to be defined according to the height and angle of attachment of each ground-working device relative to the other. Thus, the vehicle to which the accessory of the spot-cultivation system is attached may be kept stationary while the ground-working devices of the accessory work in sequence or unison with each other to prepare the ground at a particular spot.

In addition, the fixed relationship of the ground-working devices ensures that every defined area will be prepared in the same or similar way, ensuring consistency in the preparation of individually spot-cultivated sites.

In preferred embodiments of the present invention the fixed relationship of the ground-working devices is capable of being adjusted to form another fixed relationship. The height and angles of one ground-working device in relation to the other may be adjusted to enable a defined area to be cultivated to a particular depth and width below ground surface and to a particular width and height above ground surface.

In preferred embodiments of the present invention the fixed relationship of the ground-working devices is capable of being adjusted by use of adjustment apparatus incorporated into the ground-working devices, in conjunction with locking apparatus. Any suitable adjustment apparatus and locking apparatus may be incorporated into, or be adapted for use with the ground-working devices of the spot-cultivation system.

In some embodiments of the present invention the relationship of the ground-working devices to each other may be variable depending on the type of ground-working devices, the number of ground-working devices used and on the particular ground preparation requirements.

In preferred embodiments of the present invention the ground-working devices of the spot-cultivation system include ripping apparatus and rake-mounding apparatus. These devices are particularly suited to spot-cultivation of an area of ground. However, other ground-working devices may be used depending on the type of ground being prepared and the purpose for which the ground is being prepared.

A range of ripping apparatus are generally known in the prior art. The ripping apparatus is particularly useful for situations where the soil types are compacted and hard to cultivate. In addition, the ripping apparatus is capable of ripping the soil to a required depth and width, in such a way that the area being cultivated is clearly defined.

In preferred embodiments of the present invention the ripping apparatus of the spot-cultivation system incorporates a body, a leading portion and a protrusion.

For ease of reference the body, leading portion and protrusion shall now be referred to as the shaft, leading edge and wing respectively, although it should be appreciated that use of these terms is not to be seen as limiting.

In preferred embodiments of the present invention the shaft is substantially straight. Having a substantially straight shaft minimises undue resistance that the shaft may otherwise encounter as the shaft moves through the ground. However, in other embodiments of the present invention the shaft of the ripping apparatus may be otherwise configured to include ripples, and so forth, and may depend upon the structure of the ground being prepared.

In preferred embodiments of the present invention the free distal end portion of the shaft, closest to the ground, is substantially tapered to enable the ripping apparatus to more easily rip into the ground. However, the free distal end portion of the shaft may also be differently configured to enable the ripping apparatus to function effectively in different types of ground.

In preferred embodiments of the present invention the leading edge of the ripping apparatus is substantially tapered to enable the shaft of the ripping apparatus to more effectively slice through the ground. However, the leading edge of the shaft may also be squared or rounded, and so forth, depending on the type and structure of the ground being prepared.

In preferred embodiments of the present invention the wing of the ripping apparatus is rigid and projects from all faces of the shaft, to ensure greater disturbance of the ground around the shaft of the ripping apparatus, than could be accomplished by a straight shaft alone.

However, in other embodiments of the present invention the ripping apparatus may incorporate shafts, leading edges and wings of differing dimensions depending upon the structural features of the ground being prepared, the area of ground being prepared and the purpose for which the ground is being prepared.

In preferred embodiments of the present invention the rake-mounding apparatus is configured to enable the ground to be both raked and mounded, using the same apparatus.

Separate raking and mounding apparatus are also known in the prior art. However, in preferred embodiments of the present invention the rake-mounding apparatus of the spot-cultivation system incorporates at least one pair of raking tynes and at least one pair of mounding tynes adapted for raking and mounding a defined area of ground previously worked by the ripping apparatus. The number and proportions of the raking tynes and the mounding tynes in the one apparatus, determines the width of the raked area and the height of the mounded earth.

Raking of the ground, loosened by the ripping apparatus, assists in the break-down of compacted soils to a looser consistency, more suitable for growing plants. Mounding of the soil contributes to the protection of planted seedlings against the effects of frosts. On frosty days the air and ground surface temperatures are typically lower than the temperature of the soil just below the surface of the ground. Mounding of the soil around a seedling plant maintains a portion of the plant within an environment which is substantially warmer and increases the survival rate of seedling plants.

In preferred embodiments of the present invention the spot-cultivation system also incorporates distributing apparatus.

In preferred embodiments of the present invention the distributing apparatus includes attachment apparatus capable of attaching the distributing apparatus to the rake-mounding apparatus of the spot-cultivation system, a reservoir, rotating apparatus and driving apparatus.

In preferred embodiments of the present invention the distributing apparatus is capable of dispensing plant growth-promoting substances, such as fertilisers, and so forth, retained in the reservoir of the distributing apparatus, onto and into the ground being prepared by the accessory of spot-cultivation system.

For ease of reference the distributing apparatus shall now be referred to as a fertiliser box although it should be appreciated that use of this term is not intended to be seen as limiting.

In preferred embodiments of the present invention the fertiliser box is capable of being removably mounted onto the rake-mounding apparatus of the spot-cultivation system. However, the fertiliser box may also be removably mounted onto the bracket of the attachment apparatus of the spot-cultivation accessory, or onto another ground-working device.

Attachment of the fertiliser box onto the rake-mounding apparatus of the spot-cultivation system enables substances dispensed by the fertiliser box to be directly incorporated into the ground, as the ground is raked and mounded. This obviates problems of wastage of substances scattered outside the area surrounding the plant and reduces the possibility of the substances being blown away by wind, or washed away by rain. In addition, incorporation of growth-promoting substances into the prepared ground provides planted seedlings with a more readily accessible source of growth-promoting substances capable of promoting healthy and vigorous plant growth.

In some embodiments of the present invention the fertiliser box may be used to distribute other substances into or onto the prepared ground. Such substances could include substances to alter the pH balance of the soil, hormonal substances to promote root growth, essential minerals necessary to correct mineral imbalances in the ground, or even substances capable of inhibiting plant growth.

In preferred embodiments of the present invention the fertiliser box is capable of dispensing measured amounts of growth-promoting substances into the spot where the soil is being cultivated by the spot-cultivation system.

Dispensing measured amounts of substances into the ground, again avoids waste of the growth-promoting substances and ensures that the plant is provided with the required amount of substances necessary for healthy and vigorous growth.

In preferred embodiments of the present invention the growth-promoting substances are capable of being dispensed in a granular or pelleted form. Granular or pelleted substances are capable of remaining in the soil for longer periods of time. Granular and pelleted forms of growth-promoting substances are also capable of providing a slow release of the components of those substances into the soil. This slow release may be due to the more gradual weathering of solid forms, and/or the controlled break-down properties of many growth-promoting substances currently available. The longer the soil retention time of the growth-promoting substances, the longer the growth-promoting substances are available to the growing plants.

However, in other embodiments of the present invention, liquid forms of growth-promoting substances may be used. This may be particularly relevant where only single applications of a particular substance is required, or ongoing exposure of the plant to a substance could prove toxic for the plant.

In preferred embodiments of the present invention the growth-promoting substances are dispensed from the fertiliser box through the combined actions of driving apparatus and rotating apparatus.

In preferred embodiments of the present invention the rotating apparatus includes a receptacle capable of being rotated between a loading position and a dispensing position.

For ease of reference the receptacle shall now be referred to as a drum, although use of this term should not be seen as limiting this specification.

In preferred embodiments of the present invention the drum is adapted to receive granular or pelleted growth-promoting substances into a tapered recess in the drum. Granules or pellets of growth-promoting substances are capable of falling from the reservoir of the fertiliser box into the tapered recess of the drum, when said drum is in its loading position.

In preferred embodiments of the present invention rotation of the drum between a loading and dispensing position enables the growth-promoting substances in the tapered recess of the drum, to be dispensed into or onto the ground being prepared by the spot-cultivation system.

In preferred embodiments of the present invention the quantity of growth-promoting substances dispensed, may be capable of being regulated by the use of blocking apparatus.

For ease of reference the blocking apparatus shall now be referred to as a drum insert, although it should be appreciated that use of this term is not to be seen as limiting.

In preferred embodiments of the present invention the drum insert is adapted to fit into the tapered recess of the rotating drum, such that varying portions of the tapered recess are blocked from receiving the growth-promoting substances.

In preferred embodiments of the present invention a number of interchangeable drum inserts may be used according to the required quantity of growth-promoting substances required to be dispensed. Where specific quantities of concentrated growth-promoting substances are required to be dispensed, the drum insert may be fabricated to include discrete-sized indentations capable of receiving lesser amounts of the growth-promoting substances.

Having interchangeable drum inserts increase the versatility of the fertiliser drum for use with a range of growth-promoting substances and for use in dispensing measured quantities of growth-promoting to a range of plant species having different requirements for the growth-promoting substances.

In addition, interchangeable drum inserts obviates problems inherent with some existing systems for dispensing growth-promoting substances, in that dispensing a measured amount avoids wastage of the growth-promoting substances, reduces the likelihood of plants being adversely affected by concentrations of growth-promoting substances which exceed the plant's tolerance range, and enables an operator to change the growth-promoting substances being dispensed without the need for time consuming alterations to the dispensing apparatus, thereby increasing the efficiency of the ground preparing operation.

However, in other embodiments of the present invention dispensing of measured amounts of growth-promoting substances may be achieved by interchangeable rotating drums adapted to receive specific quantities of growth-promoting substances in specifically shaped recesses within the rotating drum. Further, measured amounts of growth-promoting substances may be dispensed by time-controlled opening of panels in the fertiliser box. In addition, any other suitable rotating apparatus may be adapted for use with the fertiliser box of the spot-cultivation system.

In preferred embodiments of the present invention rotation of the drum between the loading position and dispensing position is capable of being achieved through the action of biasing apparatus in combination with the driving apparatus.

For ease of reference the biasing apparatus shall now be referred to as a drive chain, although it should be appreciated that the use of this term is not to be seen as limiting.

In preferred embodiments of the present invention the chain is capable of movement. However, any number of suitable biasing apparatus may be adapted for use with the drum of the fertiliser box. Movement of the chain in conjunction with the driving apparatus of the fertiliser box is capable of effecting rotation of the drum.

In preferred embodiments of the present invention the driving apparatus of the fertiliser box includes motion-promoting apparatus, motion-controlling apparatus, operating apparatus and pulley apparatus.

For ease of reference the motion-promoting apparatus, the motion-controlling apparatus, the operating apparatus and pulley apparatus shall now be referred to as a motor, a gear box, a switch and a pulley respectively, although it should be appreciated that use of these terms should not be seen as limiting.

Accordingly, in preferred embodiments of the present invention the driving apparatus of the fertiliser box includes an electric-powered motor, a straight gear drive, a manual switch and at least a pair of pulleys, all of which operate in conjunction with each other and the drive chain, to activate the rotating apparatus.

However, in some embodiments of the present invention the driving apparatus of the fertiliser box may include a battery, may incorporate a 90° drive gear box, or be operated hydraulically. In addition, any other suitable driving apparatus may be adapted for use with the fertiliser box.

In preferred embodiments of the present invention spraying apparatus is incorporated into the bracket of the spot-cultivation system. Any suitable of spraying apparatus may be adapted for use with the spot-cultivation system.

In preferred embodiments of the present invention the spraying apparatus is capable of dispensing growth-inhibiting fluids around each defined area of ground prepared by the spot-cultivation system. Growth-inhibiting fluids sprayed around the prepared spot is capable of controlling the growth of unwanted vegetation which may impede the growth of the preferred plant species planted in the prepared spot. Such vegetation may restrict light to the preferred plant, as well as compete with the preferred plant for water, nutrients and space.

However, in other embodiments of the present invention the spraying apparatus may be used to dispense other fluids such as liquid fertilisers, water, and so forth.

In preferred embodiments of the present invention the spraying apparatus is capable of being adjusted so that fluids sprayed by the spraying apparatus may be directed on either or both of the prepared ground or the area surrounding the prepared ground.

In preferred embodiments of the present invention the ripping apparatus, rake-mounding apparatus, distributing apparatus and spraying apparatus are capable of being activated by a combination of manoeuvring apparatus in conjunction with a combination of operating apparatus.

The manoeuvring apparatus includes hydraulic rams, chain or belt-drives and pivoting systems; and the operating apparatus includes electric or petrol driven motor, batteries, hydraulic systems, electrical circuitry, and pumping systems.

A variety of hydraulic rams, chain or belt drives, pivoting systems, motors, batteries, hydraulic systems, pumping systems, and electrical circuitry are available in the prior art and may be adapted for use with the spot-cultivation system as many other suitable manoeuvring and/or operating apparatus.

In preferred embodiments of the present invention the ripping apparatus, rake-mounding apparatus, distributing apparatus and spraying apparatus of the spot-cultivation system are made of metal. Metal is durable, strong and can be moulded, welded or cut to the required shape.

However, in other embodiments of the present invention portions of the spot-cultivation system may be made of other materials. For example, the drum of the cultivation system may be made of wood, rubber, or thermoplastic material; and the hoses of the spraying apparatus may be made of rubber or thermoplastic material.

BEST MODES FOR CARRYING OUT THE INVENTION

Figure 1:
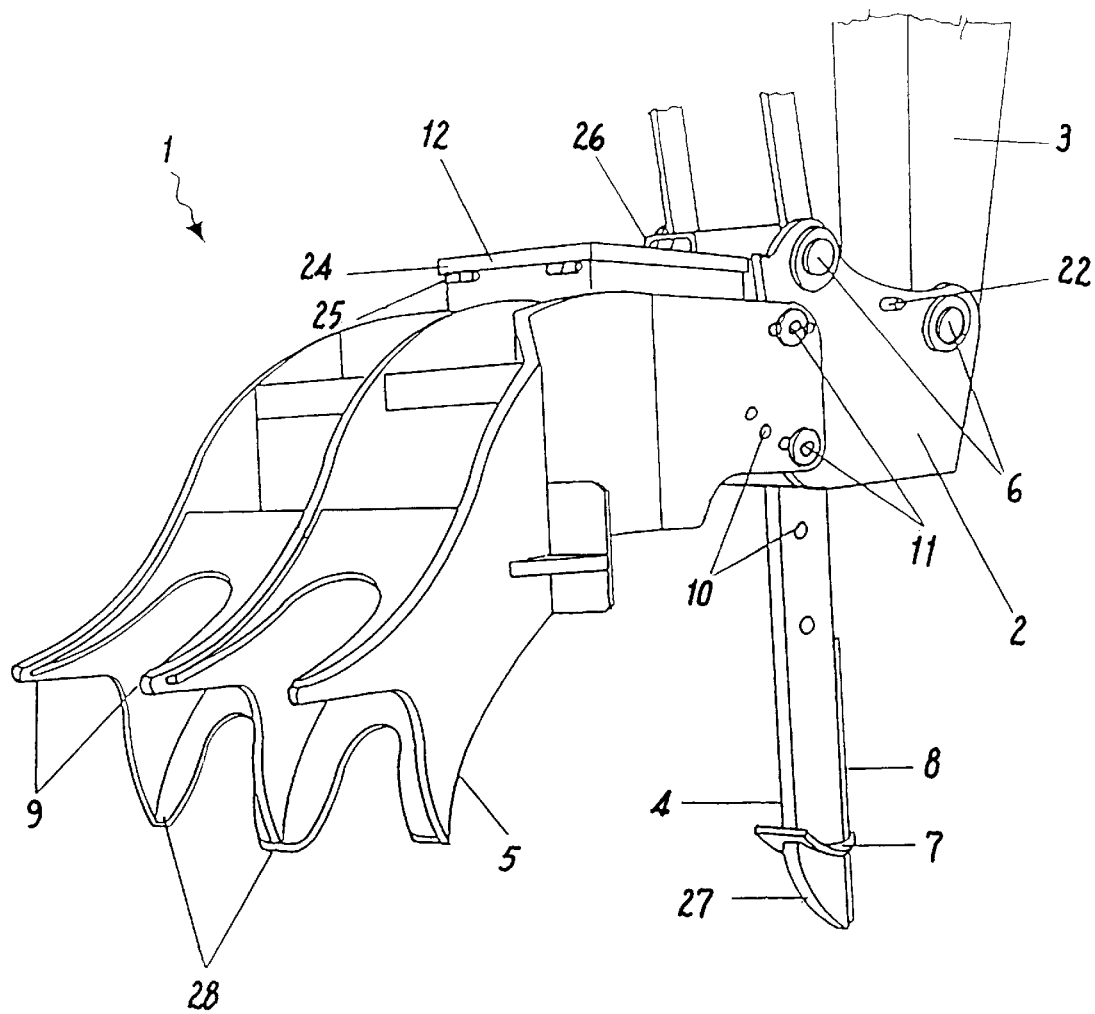
FIG. 1 is a diagrammatic perspective view of a spot-cultivation system in accordance with one embodiment of the present invention.

With reference to the diagrams by way of example only there is provided a spot-cultivation system which includes an accessory generally indicated by arrow 1 for spot-cultivation. Attachment apparatus 2 is capable of attaching the accessory 1 to a vehicle 3. At least two ground-working devices 4 and 5 are in a fixed relationship to each other so that the area of ground worked by the devices 4 and 5 is defined.

FIG. 1 is a diagrammatic perspective view of the spot-cultivation system in accordance with one embodiment of the present invention.

The accessory 1 of the spot-cultivation system, such as an excavator 3, is capable of being attached to the hydraulic arm of a vehicle 3 by use of removable bolts 6.

The two ground-working devices 4 and 5, of the accessory 1 of the spot-cultivation system include ripping apparatus 4 and rake-mounding apparatus 5, at a fixed height and fixed angle in relation to each other to optimally cultivate the ground in a defined area.

Figure 2:
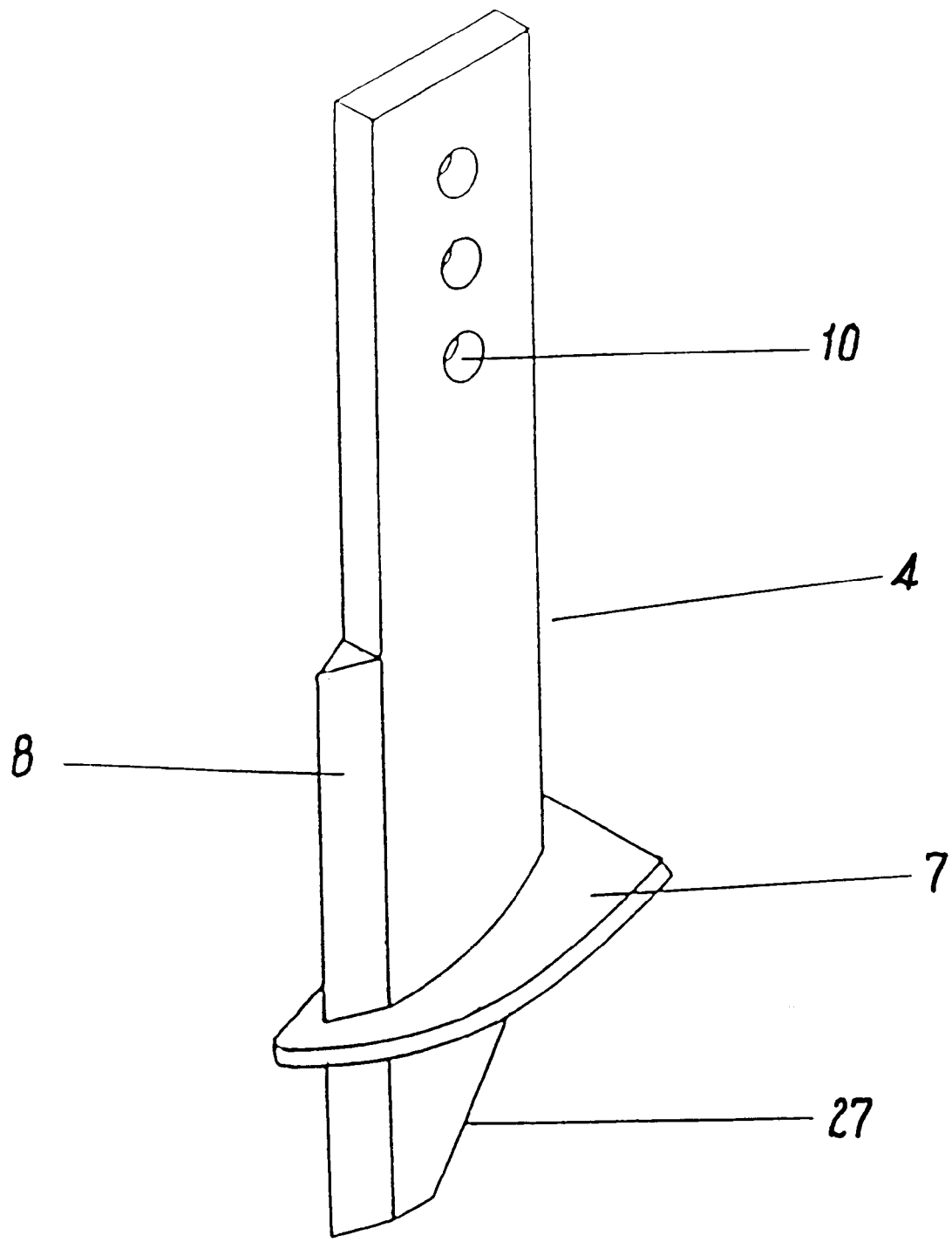
FIG. 2 is a diagrammatic perspective view of the ripping apparatus of a spot-cultivation system in accordance with one embodiment of the present invention.

FIG. 2 is a diagrammatic perspective view of the ripping apparatus 4 of the spot-cultivation system in accordance with one embodiment of the present invention. The ripping apparatus 4 comprises a wing 7 to enable greater disturbance of the ground to a defined depth and width around the ripping apparatus 4. The leading edge 8 of the ripping apparatus 4 is substantially tapered to improve the movement of the ripping apparatus 4 through the ground. The free distal portion 27 of the ripping apparatus 4, is also substantially tapered to improve initial penetration of the ground by the ripping apparatus 4.

After the ground has been ripped by the ripping apparatus 4, the rake-mounding apparatus 5 is used. The rake-mounding apparatus 5 includes rake tines 9 which rake the earth disturbed by the ripping apparatus 4 and mounding tines 28 to mound the raked earth to a height suitable for planting seedling plants, such as Pinus and Eucalyptus tree species.

The fixed relationship of the ground-working devices 4 and 5 may be adjusted to alter the depth of the rip, the depth of the rake, or the height to which the ground is mounded. Adjustment of the fixed relationship of the ground-working devices 4 and 5 is accomplished by use of adjustment apparatus 10 incorporated into the ground-working devices 4 and 5, and locking apparatus 11, such as bolts.

The fixed positioning of the ripping apparatus 4 in relationship to the rake-mounding apparatus 5, and the width of the rake-mounding apparatus 5 itself, act in combination to enable the ground to be spot-cultivated at defined spacings and in defined rows. Spot-cultivation of the ground at defined spacings and in defined rows is desired to accommodate the growth of seedlings planted at the prepared spot site and avoids unnecessary disturbance to the surrounding ground.

Figure 3:
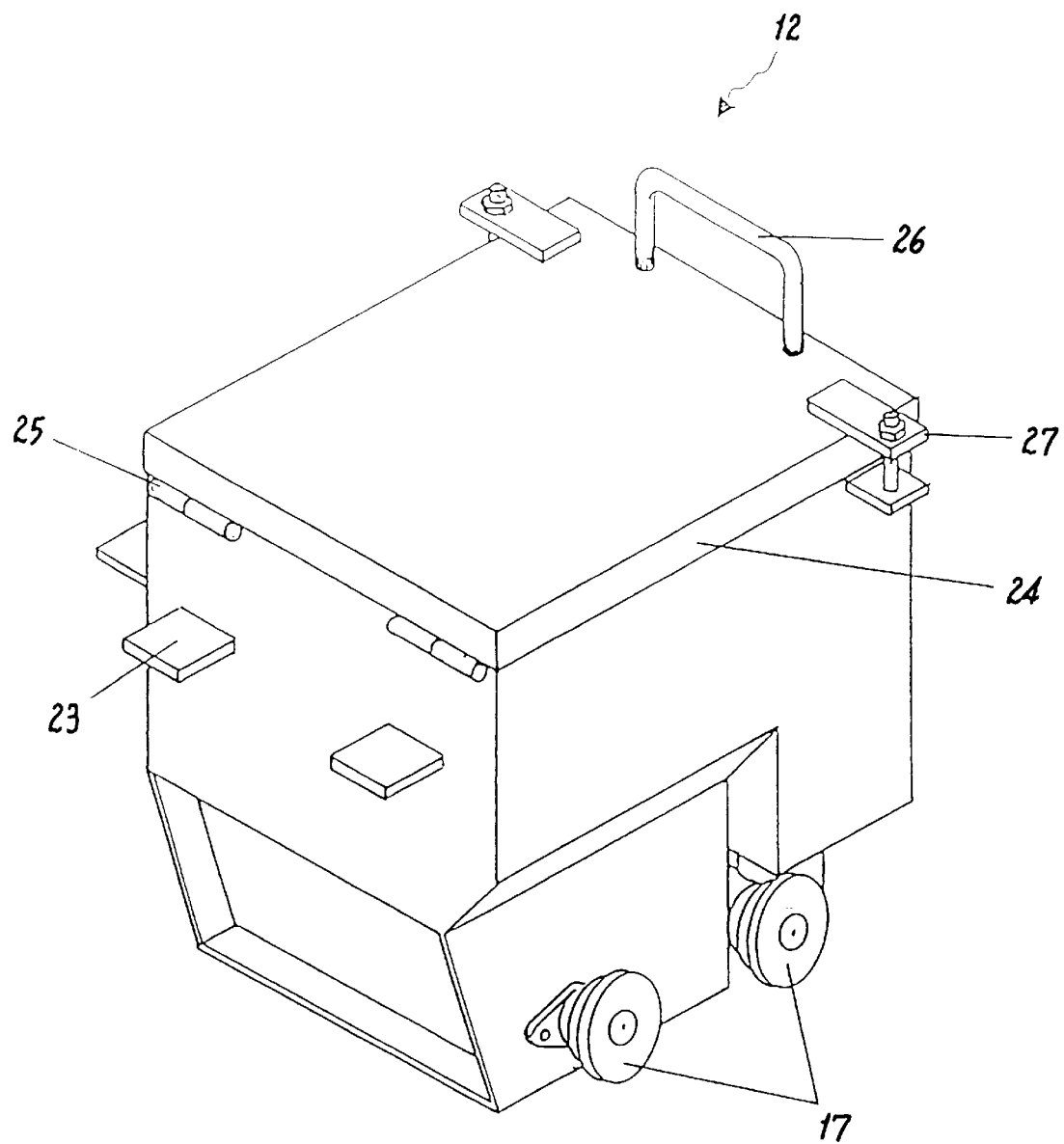
FIG. 3 is a diagrammatic perspective view of the distributing apparatus of a spot-cultivation system in accordance with one embodiment of the present invention.
Figure 4:
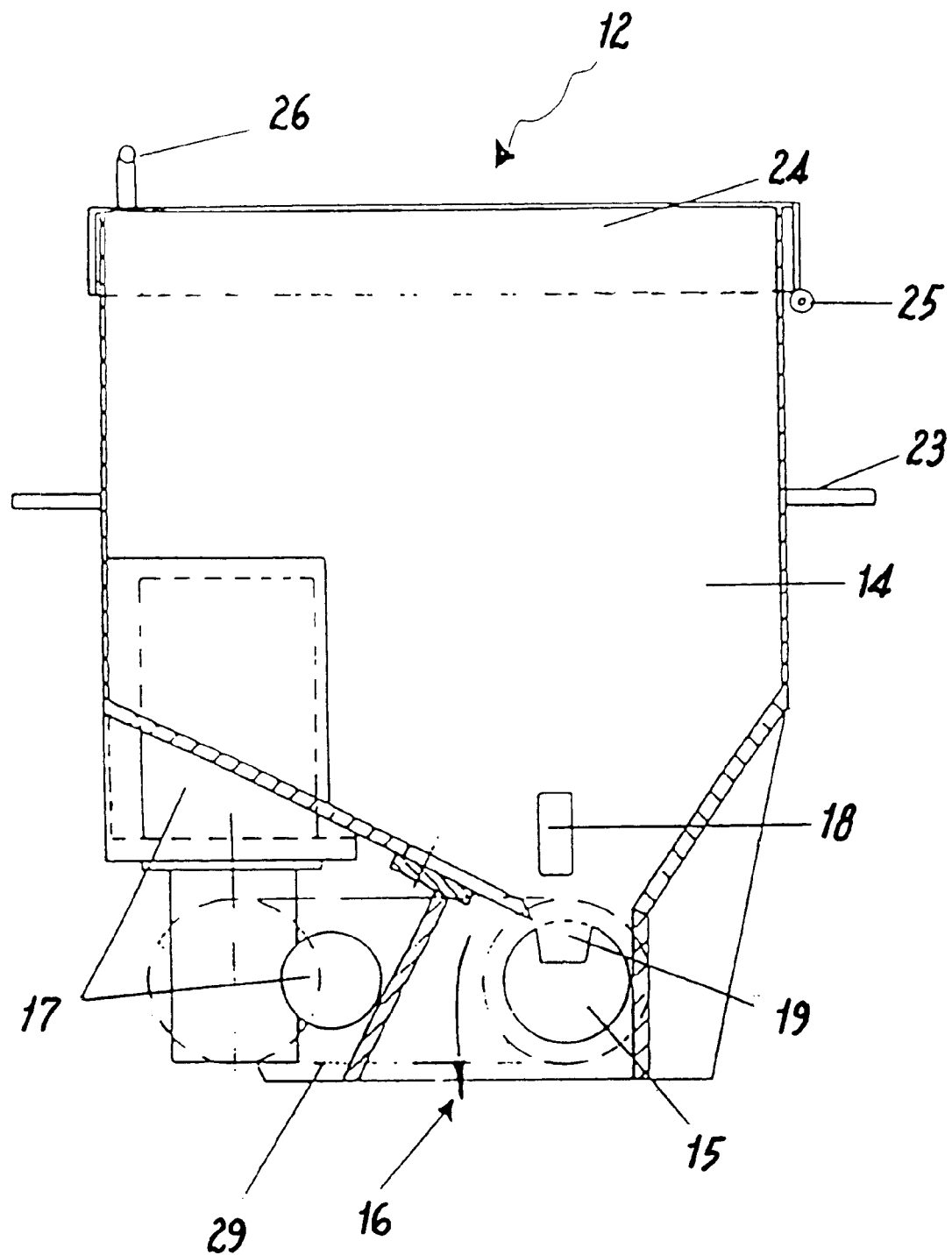
FIG. 4 is a diagrammatic side cross-sectional view of the distributing apparatus of a spot-cultivation system in accordance with one embodiment of the present invention.
Figure 5:
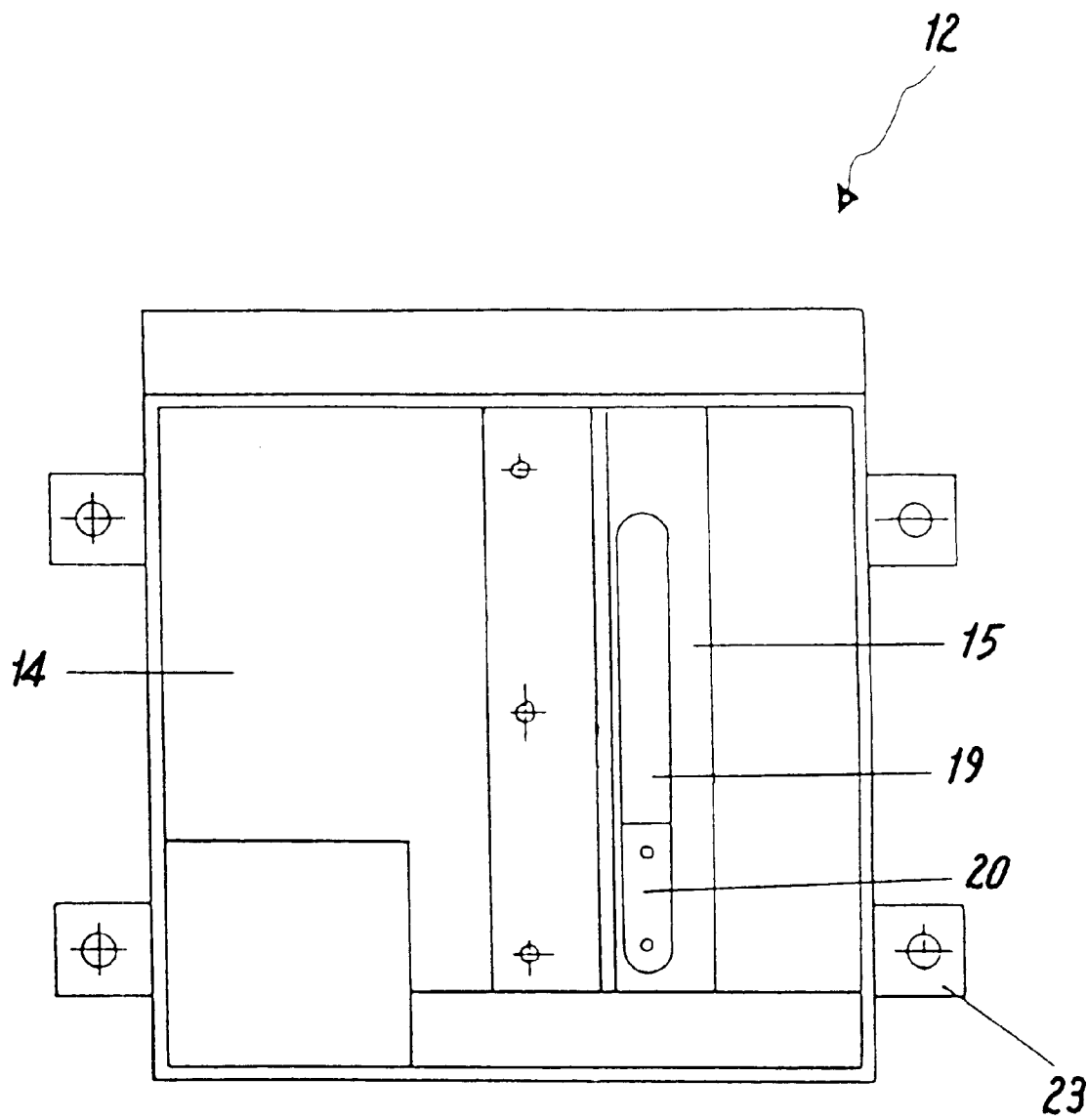
FIG. 5 is a diagrammatic top view of the distributing apparatus of a spot-cultivation system in accordance with one embodiment of the present invention.

The spot-cultivation system also incorporates distributing apparatus 12. FIGS. 3 to 5 inclusive, are diagrammatic views of the distributing apparatus 12 in accordance with one embodiment of the present invention.

For ease of reference the distributing apparatus 1 shall now be referred to as the fertiliser box, although it should be appreciated that use of this term is not intended to be limiting.

The fertiliser box 12 is incorporated into the rake-mounding apparatus 5 via attachment apparatus 23. The fertiliser box 12 is capable of holding amounts of granular or pelleted growth-promoting substances 13 in a reservoir 14.

The reservoir 14 of the fertiliser box 12 may be filled by gripping the handle 26 and raising the lid 24 which is hinged at 25 to the body of the fertiliser box 12. During operation of the spot-cultivation system the lid 24 is retained in a closed position by latches 27.

Measured amounts of growth-promoting substances 13 are able to be dispensed by rotating apparatus 15 in conjunction with biasing apparatus 29 and driving apparatus 17 and 18 of the fertiliser box 12.

Figure 6:
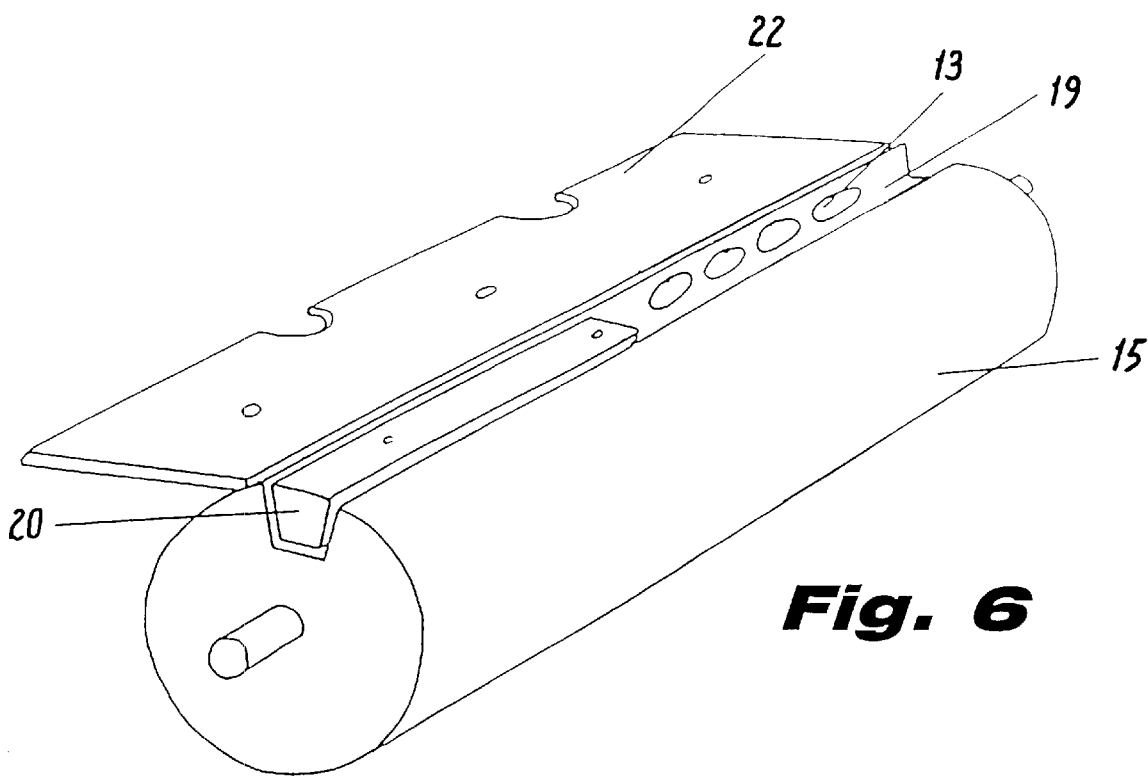
FIG. 6 is a diagrammatic perspective view of a drum of a distributing apparatus of a spot-cultivation system in accordance with one embodiment of the present invention.

FIG. 6 is a diagrammatic perspective view of the rotating drum 15 of the fertiliser box 12.

The rotating drum 15 is located in the lower portion of the fertiliser box 12, and is capable of rotating, as illustrated by arrow 16 in FIG. 4 between a loading position and a dispensing position, to dispense the growth-promoting substances 13 into the ground, as the ground is raked and mounded by the rake-mounding apparatus 5.

When the rotating drum 15 is in the loading position, as shown in FIG. 6, granular or pelleted growth-promoting substances 13 are transferred, by the force of gravity, from the reservoir 14 of the fertiliser box 12, across a transfer bar 22, and into a tapered recess 19 in the drum 15.

Figure 7:
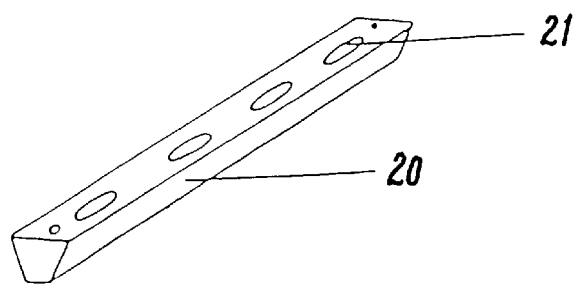
FIG. 7 is a diagrammatic perspective view of a drum insert of a distributing apparatus of a spot-cultivation system in accordance with another embodiment of the present invention.

The amount of growth-promoting substance 13 may be regulated by the insertion of a drum insert 20 into the tapered recess 19. The drum insert 20 reduces the ability of the tapered recess 19 to receive growth-promoting substances 13. Where more concentrated forms of growth-promoting substances 13 are used, a full length bar 20 which incorporates pockets 21 may be inserted into the tapered recess 19 to further control the measured quantity of growth-promoting substances 13 released into the ground, as shown in FIG. 7.

Rotation of the rotating drum 15 between loading and dispensing positions, enables the growth-promoting substances 13 held in the tapered recess 19 of the drum 15 to be dispensed into the ground. Rotation of rotating the drum 15 is accomplished by the operation of biasing apparatus 29 in conjunction with driving apparatus 17 and 18.

The spot-cultivation system also incorporates spraying apparatus 22 into the attachment apparatus or bracket 22 of the accessory 1. The spraying apparatus 27 is capable of spraying the prepared ground with fluids.

The spraying apparatus 22 is capable of being adjusted to ensure selective spraying of fluids onto and/or around the cultivated spot.

The ripping apparatus 4, rake-mounding apparatus 5, the rotating drum 15 of the distributing apparatus 12 and spraying apparatus 22 of the spot-cultivation system are capable of being activated by manoeuvring apparatus in conjunction with operating apparatus of vehicle 3.

Typically, the manoeuvring apparatus includes a combination of hydraulic rams, chain or belt drives, and pivoting systems. In addition, the operating apparatus includes a combination of electric or petrol driven motors, batteries, hydraulic systems, electrical circuitry, and pumping systems.

Aspects of the present invention have been described by way of example only and it should be appreciated that modifications and additions may be made thereto without departing from the scope thereof as defined in the appended claims.

What is claimed is:

1. A spot-cultivation system including an accessory for spot-cultivation, comprising:
    attachment apparatus for attaching the accessory to a stationary vehicle, the accessory including
        at least two ground working devices held in a fixed spatial relationship to each other to work a confined area of ground as defined by the fixed relationship, and wherein one of said ground working devices comprises a ripping apparatus and a second ground working device comprises rake-mounding apparatus having at least one set of one or more raking tynes, and at least one set of one or more mounding tynes, and said raking tynes extending in a different direction relative to said mounding tynes.

2. A spot-cultivation system as claimed in claim 1 in combination with a stationary excavator to which said accessory is attached.

3. A spot-cultivation system in combination with an excavator as claimed in claim 2 wherein said accessory is attached to the free distal end portion of a hydraulic arm of the excavator, via adapting apparatus in combination with removable fastening apparatus.

4. A spot-cultivation system in combination with an excavator as claimed in claim 3 wherein the adapting apparatus comprises a bracket.

5. A spot-cultivation system as claimed in claim 1 wherein the ripping apparatus incorporates a substantially straight body, a substantially tapered leading portion and a protrusion.

6. A spot-cultivation system as claimed in claim 5 wherein the protrusion of the ripping apparatus projects from all faces of the body of the ripping apparatus, to ensure greater disturbance of the ground being prepared by the ripping apparatus.

7. A spot-cultivation system as claimed in claim 1 wherein said set of raking tynes and said set of mounding tynes of said rake-mounding apparatus are adapted for raking a defined area of loosened ground previously worked by the ripping apparatus, and for mounding that ground to a height required for planting seedling plants, respectively.

8. A spot-cultivation system as claimed in claim 7 wherein the raking tynes and the mounding tynes of said rake-mounding apparatus are adapted to respectively rake and mound loosened ground to a height required for planting tree seedlings.

9. A spot-cultivation system as claimed in claim 1 wherein the height and angle of said one ground working device in relation to said second ground working device is adjustable and then fixed in that spatial relationship to enable a defined area to be cultivated to a particular depth and particular width below ground surface, and to a particular width and particular height above ground surface.

10. A spot-cultivation system as claimed in claim 9 wherein the fixed relationship of said two ground working devices is capable of being adjusted between successive cultivation operations by adjustment apparatus incorporated into the ground working devices, in conjunction with locking apparatus.

11. A spot-cultivation system as claimed in claim 1 wherein the spot-cultivation system further comprises distributing apparatus.

12. A spot-cultivation system as claimed in claim 11 wherein said distributing apparatus is removably mounted on the rake-mounding apparatus.

13. A spot-cultivation system as claimed in claim 12 wherein said distributing apparatus transfers measured amounts of substances, in granular or pellet form, from a reservoir in said distributing apparatus to be incorporated into the ground during preparation of the ground by said at least two ground working devices of the spot-cultivation system prior to planting seedling plants.

14. A spot-cultivation system as claimed in claim 13 wherein said distributing apparatus dispenses plant growth-promoting substances.

15. A spot-cultivation system as claimed in claim 14 where the plant growth-promoting substances dispensed by the distributing apparatus are fertilisers.

16. A spot-cultivation system as claimed in claim 14 wherein said distributing apparatus comprises driving apparatus and rotating apparatus.

17. A spot-cultivation system as claimed in claim 16 wherein said rotating apparatus of said distributing apparatus includes a receptacle for rotation between a loading position and a dispensing position, and biasing apparatus for effecting rotation of said receptacle.

18. A spot-cultivation system as claimed in claim 17 wherein said receptacle of said rotating apparatus includes a tapered recess to receive growth-promoting substances.

19. A spot-cultivation system as claimed in claim 18 claims wherein said tapered recess of said receptacle is adapted to receive blocking apparatus for regulating the quantity of growth-promoting substances dispensed from said tapered recess of said receptacle of said rotating apparatus.

20. A spot-cultivation system as claimed in claim 16 wherein said driving apparatus of said distributing apparatus includes motion-promoting apparatus, motion-transfer apparatus, actuating apparatus and pulley apparatus.

21. A spot-cultivation system as claimed in claim 20 wherein said motion-promoting apparatus, motion-transfer apparatus, actuating apparatus and pulley apparatus includes respectively, an electric powered motor, a straight gear-drive, a manual switch and at least a pair of pulleys, all of which operate in conjunction with each other to activate said rotating apparatus.

22. A spot-cultivation system as claimed in claim 1 wherein the spot-cultivation system further comprises spraying apparatus.

23. A spot-cultivation system as claimed in claim 22 wherein said spraying apparatus is for spraying growth-inhibiting fluids around and onto each defined area of ground prepared by said spot-cultivation system.

24. A spot-cultivation system as claimed in claim 23 wherein the growth-inhibiting fluids dispensed by said spraying apparatus are herbicides.

25. A spot-cultivation system as claimed in claim 1 wherein the spot-cultivation system further comprises maneuvering apparatus and operating apparatus for activating said ripping apparatus, rake-mounding apparatus, and a distributing apparatus and a spraying apparatus.

26. A spot-cultivation system as claimed in claim 25 wherein said maneuvering apparatus includes hydraulic rams, chain or belt drives and pivoting systems.

27. A spot-cultivation system as claimed in claim 26 wherein said operating apparatus includes motors, hydraulic systems, electrical circuitry and pumping systems.

28. A method of spot-cultivation of a confined area of ground prior to planting seedling plants comprising:

using a spot-cultivation system which includes an accessory for spot-cultivation, and attachment apparatus for attaching the accessory in use to a stationary vehicle, the accessory including distributing apparatus and spraying apparatus, and at least two ground working devices held in a fixed spatial relationship to each other, wherein one of the ground working devices comprises a ripping apparatus and the second ground working device comprises rake-mounding apparatus, and wherein the rake-mounding apparatus in turn comprises at least one set of one or more raking tynes, and a set of one or more mounding tynes, and wherein the raking tynes extend in a different direction relative to the mounding tynes, the arrangement being that all the apparata are included in the one spot-cultivation system, and keeping the vehicle to which the accessory for spot-cultivation is attached stationary while the ground working devices cultivate the ground at a spot defined by the fixed spatial relationship of the ground working devices.

29. A method of spot-cultivation using a spot-cultivation system as claimed in claim 28 wherein the fixed spatial relationship of the ground-working devices enables the ground-working devices to work in sequence or in unison with each other to prepare the ground at a defined spot.

30. A method of spot-cultivation as claimed in claim 29 wherein the fixed spatial relationship of the ground-working devices of the accessory for spot-cultivation ensures there is consistency in the preparation of every independent spot-cultivated defined spot.

* * * * *